(12) United States Patent
Douma et al.

(10) Patent No.: US 6,930,300 B1
(45) Date of Patent: Aug. 16, 2005

(54) METHOD AND APPARATUS FOR MONITORING A PHOTO-DETECTOR IN AN OPTICAL TRANSCEIVER

(75) Inventors: Darin James Douma, Monrovia, CA (US); Philip D. Shapiro, Palo Alto, CA (US); Linda Xiaorong Liu, San Jose, CA (US)

(73) Assignee: Finisar Corporation, Sunnyvale, CA (US)

( * ) Notice: Subject to any disclaimer, the term of this patent is extended or adjusted under 35 U.S.C. 154(b) by 155 days.

(21) Appl. No.: 10/209,452

(22) Filed: Jul. 30, 2002

(51) Int. Cl.[7] .............................................. H01J 40/14
(52) U.S. Cl. ................................ 250/214 A; 250/214 R
(58) Field of Search ........................... 250/551, 214 A, 250/214 R (56) References Cited

U.S. PATENT DOCUMENTS

| 4,879,524 A | * | 11/1989 | Bell .......................... 330/288 |
| 5,303,027 A | * | 4/1994 | Kuderer et al. ............. 356/328 |
| 5,307,027 A | * | 4/1994 | Grasset ...................... 330/288 |
| 5,481,118 A | | 1/1996 | Tew ........................... 250/551 |
| 5,805,641 A | | 9/1998 | Patel ......................... 375/317 |
| 5,956,168 A | | 9/1999 | Levinson et al. ............ 398/41 |
| 5,981,936 A | | 11/1999 | Fujiie ........................ 250/214 A |
| 6,188,059 B1 | | 2/2001 | Nishiyama et al. ......... 250/214 R |
| 6,333,804 B1 | | 12/2001 | Nishiyama et al. ......... 398/202 |

FOREIGN PATENT DOCUMENTS

| JP | 2069980 | 3/1990 |
| JP | 4088371 | 3/1992 |

* cited by examiner

Primary Examiner—Thanh X. Luu
(74) Attorney, Agent, or Firm—Workman Nydegger (57) ABSTRACT

The method and apparatus for monitoring a photo-detector generates a highly compliant mirror current across a broad range of photo-detector current levels. The apparatus for monitoring includes: a pair of bipolar transistors and a first non-linear isolation element. The pair of transistors are connected in a mirror configuration with a sense transistor one of the pair of transistors sensing a photo-detector current and with a mirror transistor one of the pair of transistors mirroring the photo-detector current with a mirror current. The first non-linear isolation element has at least two terminals a first of which couples to the collector of the mirror transistor. The first non-linear isolation element exhibits a non-linear voltage drop between the at least two terminals in response to varying levels of the mirror current to improve compliance between the mirror current and the detector current. Methods and means for monitoring a photo-detector are also disclosed.

23 Claims, 8 Drawing Sheets

High Side Monitor

METHOD AND APPARATUS FOR MONITORING A PHOTO-DETECTOR IN AN OPTICAL TRANSCEIVER

BACKGROUND OF THE INVENTION

1. Field of Invention

The field of the present invention relates in general to optical networks and more particularly to optical receivers.

2. Description of the Related Art

In communication systems light beams are increasingly used for transmitting information. The demand for communication bandwidth has resulted in a conversion of long and short haul communication trunk lines from copper to fiber optic (digital) communication. The wide spectral characteristics of fiber optics support broadband signals at very high data rates, gigabits per second.

Generally, an optical source, i.e. transmitter, converts an electrical signal, either digital or analog, to a modulated light beam which is then passed through an optical fiber to an optical detector, i.e. receiver, that extracts an electrical signal from the received light beam. A fiber may be shared with different communication channels using frequency, time or other forms of multiplexing. A typical optical link extends the range of a communication system with a transceiver unit that handles opto-electronic conversion between an optical fiber(s) and local area networks (LAN) on opposing ends of the fiber. Optical transceivers offer gigabit communication rates over long haul trans-oceanic cables or short range links in a metropolitan area.

Monitoring of optical transceivers is employed for diagnostic or preventive maintenance purposes. Monitored parameters include: laser bias current, transmit optical power, receive optical power, temperature, etc. A typical transmitter operates at a fixed power level. Since an optical link may range in distance from several meters to a hundred kilometers the optical receiver must function at a broad range of received signal strengths. Receiver monitoring is employed to assure the received signal is in appropriate range to ensure proper decoding of data at receiver.

What is needed are new means for monitoring optical receivers.

SUMMARY OF THE INVENTION

A method and apparatus is disclosed for monitoring a photo-detector which may be part of an optical receiver or transducer. The monitoring of the photo-detector may be used to determine the strength of a received optical signal during setup or normal operation of an optical communication system. During normal operation received signal strength can be used to determine component aging. The monitor generates a mirror current which is highly compliant with the photo-detector current across a broad current range. The linearity of the monitor circuit makes it particularly suited for optical networks such as telecommunication networks with a broad range of lengths between network transceiver nodes.

In an embodiment of the invention the apparatus for monitoring includes: a pair of bipolar transistors and a first non-linear isolation element. The pair of transistors are connected in a mirror configuration with a sense transistor one of the pair of transistors sensing a photo-detector current and with a mirror transistor one of the pair of transistors mirroring the photo-detector current with a mirror current. The first non-linear isolation element has at least two terminals a first of which couples to the collector of the mirror transistor. The first non-linear isolation element exhibits a non-linear voltage drop between the at least two terminals in response to varying levels of the mirror current to improve compliance between the mirror current and the detector current.

In alternate embodiments of the invention method and means for monitoring a photo-detector are also disclosed and claimed.

BRIEF DESCRIPTION OF THE DRAWINGS

These and other features and advantages of the present invention will become more apparent to those skilled in the art from the following detailed description in conjunction with the appended drawings in which.

DETAILED DESCRIPTION OF THE EMBODIMENTS

Figure 1:
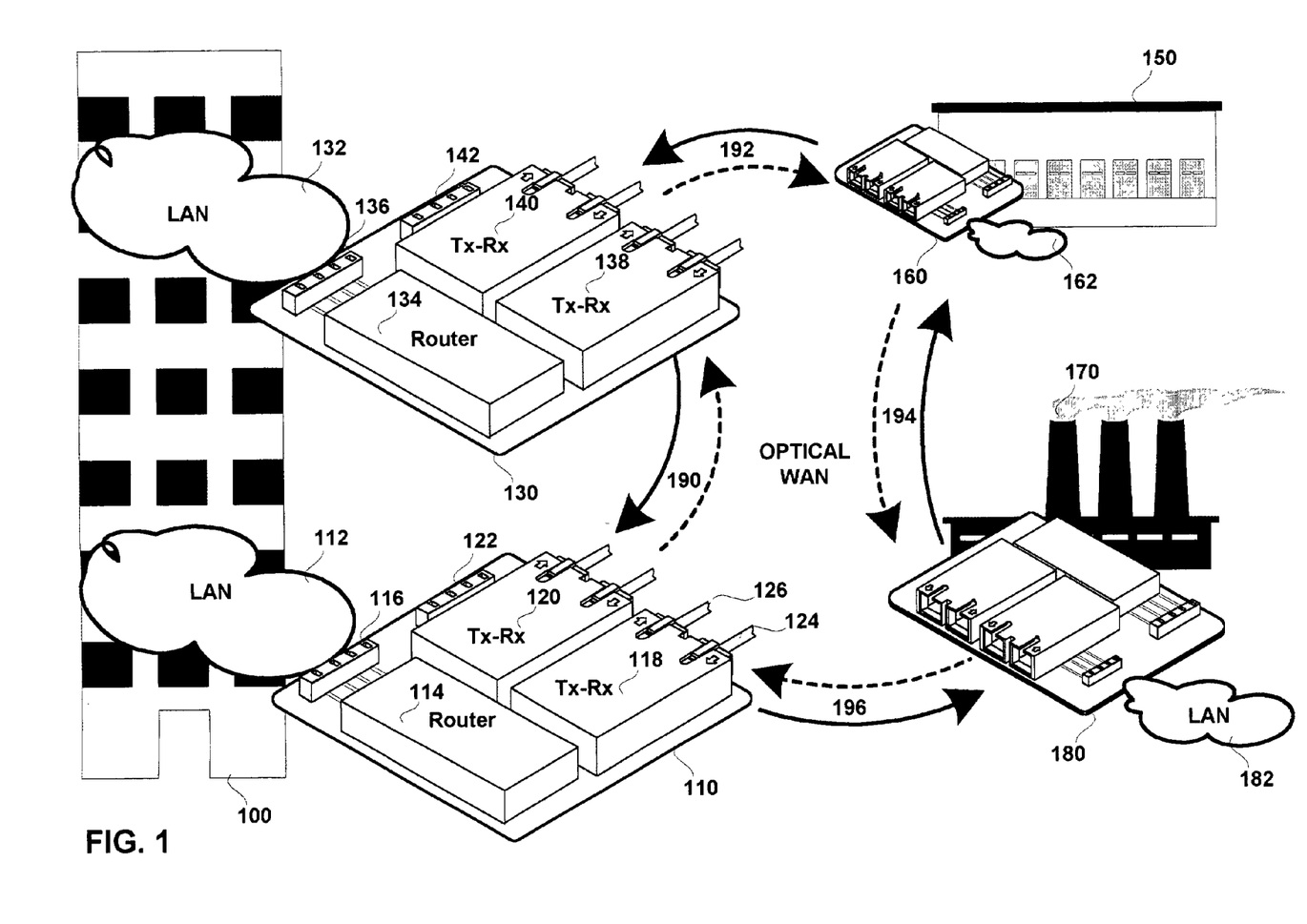
FIG. 1 shows a plurality of optical transceivers coupled to one another to form a wide area network (WAN).

FIG. 1 shows a plurality of optical transceivers coupled to one another to form a wide area optical network (WAN) which handles communications between a plurality of local area networks (LANS). LANS 112, 132 are shown in a corporate headquarters 100. LAN 162 is shown in the corporate warehouse 150. LAN 182 is shown in the corporate factory 170. All LANS are linked by a high speed optical backbone network. Optical segments of the optical network may vary in length from a few meters to hundreds of kilometers. At each corporate location the corresponding LAN provides electrical communication links to networked workstations, servers, process machinery, etc. To handle the high bandwidth communication between LANs optical transceiver cards 110, 130, 160 and 180 are shown coupled to LANS 112, 132,162 and 182 respectively. These optical transceiver cards are optically linked together and form the nodes of the optical backbone network which handles high speed communications between the LANs.

In the embodiment shown each optical transceiver card comprises a pair of dual port transceivers and a router. Each transceiver card forms a node of the optical network. The optical network links the LANs. The transceivers cards are coupled in a dual ring topology with ring segments 190,192, 194, 196. Each transceiver is shown receiving and transmitting optically modulated information from either of the dual rings. Each transceiver has a receive port and a transmit port coupled to the corresponding segments of each ring. Information can be thought of as passing clockwise in one ring and counterclockwise in the other of the dual rings. All transceivers perform an optical-to-electrical conversion on received data which is then analyzed by an integral router to determine its destination. If the information is determined by one of the routers to be destined for a LAN to which the transceiver card is coupled then the router offloads the information from the optical network to the corresponding LAN.

Optical card 110 includes two transceivers 118, 120 and a router 114. The router 114 couples through a LAN interface 116 with LAN 112. The transceivers couple via corresponding pairs of transmit and receive ports to the corresponding network segments which form the dual optical ring topology. Fiber optic cables 126 and 124 handle the transmission and reception respectively of information between line cards 110 and 180 via ring segments 196. Another pair of fiber optic cables (not shown) handle the transmission and reception of information between line cards 110 and 130 via ring segments 190. Monitoring of the transceivers 118–120 occurs via the monitor interface 122.

Optical card 130 includes two transceivers 138, 140 and a router 134. The router 134 couples through a LAN interface 136 with LAN 132. The transceivers couple via corresponding pairs of transmit and receive ports to the corresponding network segments which form the dual optical ring topology. Fiber optic cables (not shown) handle the transmission and reception of information between line cards 130 and 160 via ring segments 192. Monitoring of the transceivers 138–140 occurs via the monitor interface 142. Line cards 160 and 180 are coupled to one another with ring segments 194.

Monitoring is employed for diagnostic or preventive maintenance purposes such as determining when to replace a component based on monitored parameters. Component aging or life cycle stage can be determined based on monitored parameters, with the result that components are replaced before failure. Monitored parameters include: laser bias current, transmit optical power, receive optical power, temperature, etc. A typical transmitter operates at a fixed power level. Since an optical link may range in distance from several meters to a hundred kilometers the optical receiver must function at a broad range, e.g. 4–6 orders of magnitude, of received signal strengths. Receiver monitoring is best done without attaching a circuit to the same node of the photodiode, cathode or anode, from which the high speed modulated signal is extracted. Connecting both monitor circuit and high speed data circuit to the same node increases the complexity of the high speed data circuit without providing compensating benefits. Attaching the monitor circuit to photodiode node which is not connected to the high speed data circuit allows for a simple overall design.

The following circuits are designed to monitor received signals with strengths varying by 4–6 orders of magnitude without effecting received signal quality.

Figure 2A:
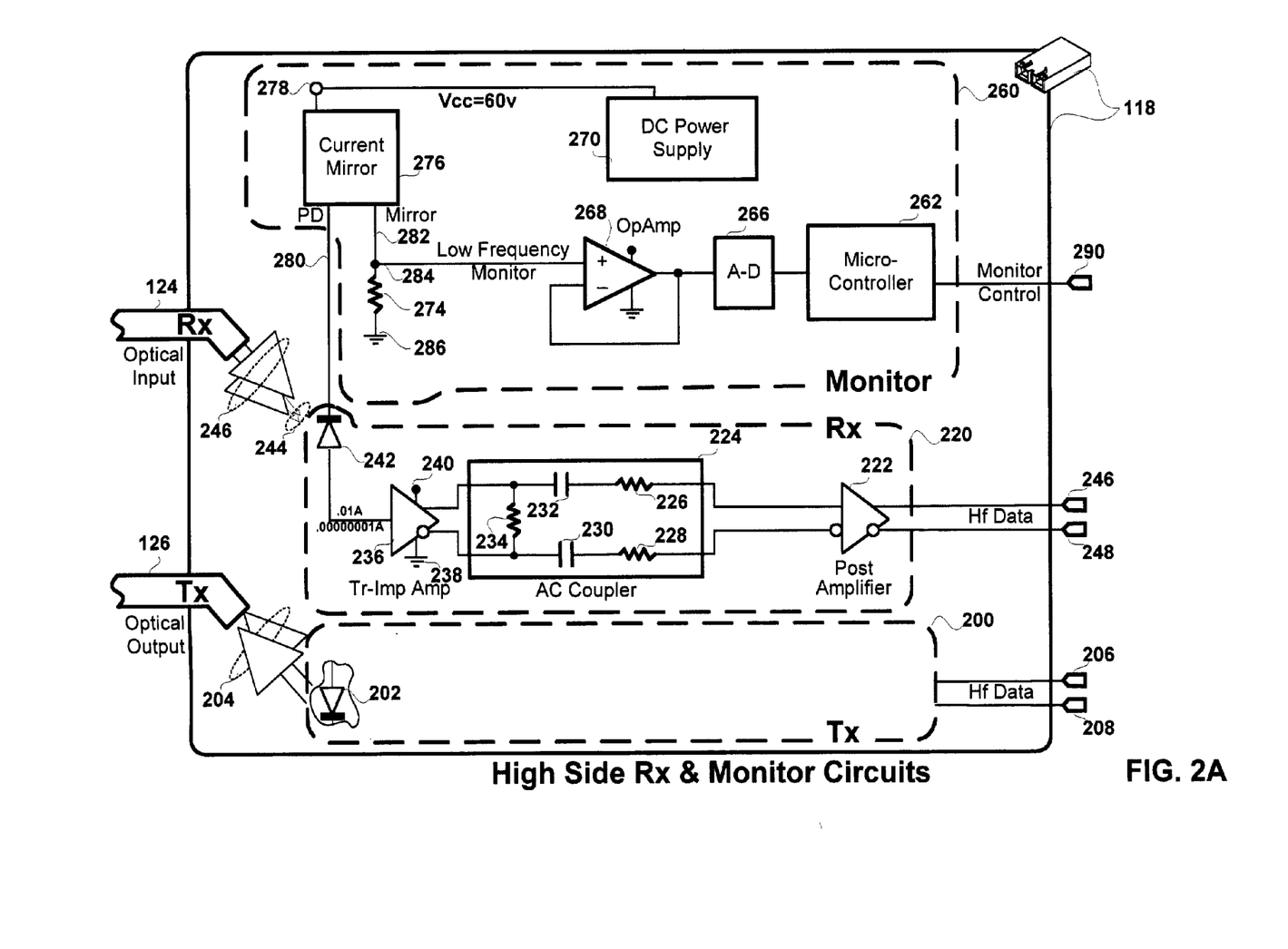
FIG. 2A is a circuit diagram of an embodiment of the invention with an optical transceiver having a monitoring circuit coupled on the high side of the optical receiver to monitor the received signal strength.

FIG. 2A is a circuit diagram of an embodiment of the invention with an optical transceiver 118 (See FIG. 1) with a transmitter 200, a receiver 220 and a monitoring circuit 260. The transmitter 200 includes one or more differential signal inputs 206–208 for high speed digital data input from the associated LAN and a photo-diode 202 which transmits an optical beam 204 modulated with the high frequency data into the corresponding fiber optic 126 which forms a segment of the optical network.

The receiver includes a photo-detector 242 optically coupled to the optical network via fiber optic 124 to receive an optically modulated information bearing signal there from. In an embodiment of the invention the photo-detector comprises a positive-intrinsic-negative (PIN) or an avalanche photo-detector (APD). A PIN operates at a 5 volt bias voltage level while an APD may operate at 40–60 volts. The signal strength of the received optical beam may vary over 4–6 orders of magnitude as represented by beams 244 and 246. In the embodiment of the invention shown in FIG. 2A the cathode of the photo-detector is coupled to the input of a trans-impedance amplifier 236 which operates as a current sink for the photo-detector. The TIA has a wide dynamic range and exceptional linearity performance. A typical telecommunications application requires the TIA to maintain a linear trans-impedance characteristic for input currents ranging from less than 0.01 uA up to 2.5 mA. The high frequency modulated and amplified electrical data is output from the TIA on differential signal lines which are impedance matched and AC coupled with the rest of the receiver circuitry via AC coupler 224. In the embodiment shown, the AC coupler includes high frequency coupling capacitors 230–232 which form together with series and parallel coupled resistors 234, 226, 228 an impedance matching network. The differential output of the AC coupler is subject to any post amplification in amplifier 222 and the opto-electrically converted signal is output by the receiver on one or more signal lines 246–248 to the rest of the receive path circuitry, e.g. the router 114 for example (See FIG. 1).

A monitor circuit 260 couples on the high side of the receiver to monitor the received signal strength as measured by the photo-detector 242. The monitor circuit includes a current mirror 276. The current mirror has two legs, a.k.a a photo-detector leg and a mirror leg, through which pass the photo-detector current "Ip" and a mirror current "Im" respectively. Both legs of the current mirror couple on the positive side to a voltage source node 278 which in the example shown is a DC power supply 270. The control leg of the current mirror couples via line 280 with the anode of the photo-detector 242. In the example shown the supply voltage is 60 volts and the photo-detector is an APD. In alternate embodiments of the invention a PIN type photo-detector may be utilized with a corresponding reduction in the supply voltage level to 5 volts for example. The mirror leg 282 of the current mirror supplies the mirror current Im on line 282, the level of which corresponds with the received optical signal level as detected by the photo-detector. In the embodiment shown, Im is monitored by conversion to a voltage proportional to current at monitor node 284. This is accomplished by coupling the monitor node resistively to an electrical sink 286. Resistor 274, which couples the monitor node to ground, is used to perform this function. The monitor node 284 is coupled to the input of an operational amplifier 268. Op-amp 268 provides an amplified output proportional to the mirror current to an analog-to-digital (A/D) converter 266. A micro-controller 262 accepts the digital signal output of the A/D where it may be utilized as part of a diagnostic. The output of the micro-controller is supplied via monitor control line 290 to the monitor interface 116 (See FIG. 1) for use by network administrator or system level diagnostic and or maintenance circuitry, not shown.

Figure 2B:
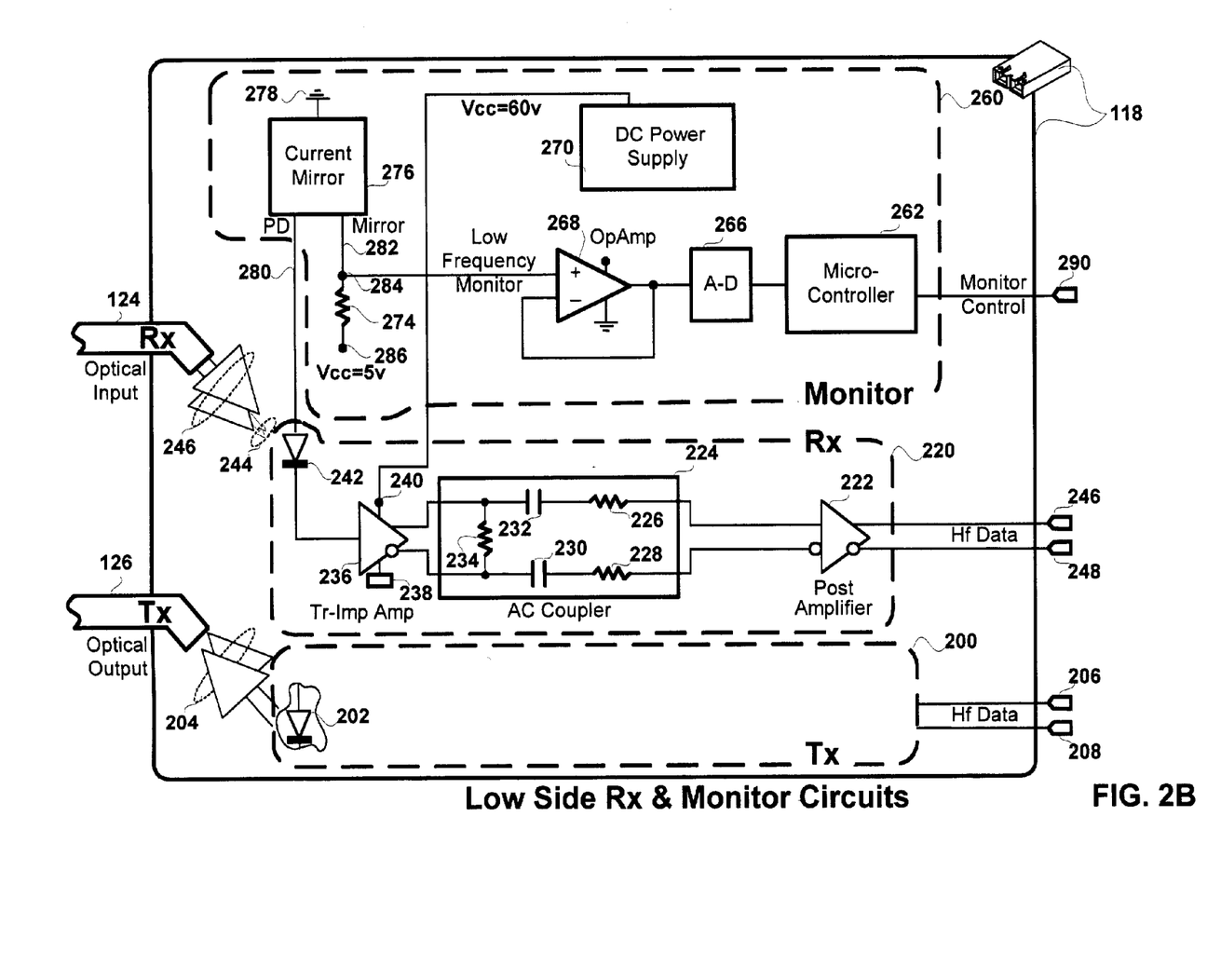
FIG. 2B is a circuit diagram of an embodiment of the invention with an optical transceiver having a monitoring circuit coupled on the low side of the optical receiver to monitor the received signal strength.

FIG. 2B is a circuit diagram of an embodiment of the invention with an optical transceiver having the monitoring circuit 260 coupled on the low side of the optical receiver 220 to monitor the received signal strength. The receiver includes the photo-detector 242 optically coupled to the optical network via fiber optic 124 to receive the optically modulated information bearing signal there from. In an embodiment of the invention the photo-detector comprises a positive-intrinsic-negative (PIN) or an avalanche photo-detector (APD). The signal strength of the received optical beam may vary over 4–6 orders of magnitude as represented by beams 244 and 246. In the embodiment of the invention shown in FIG. 2B the anode of the photo-detector is coupled to the input of a trans-impedance amplifier 236 which operates as a current source for the photo-detector. The TIA has a wide dynamic range and exceptional linearity performance over currents ranging from less than 0.01 uA up to 2.5 mA. The TIA has a Vsource input 240 coupled to the DC power supply 270 which is part of the monitor circuit. The Vsink input 238 of the TIA is coupled to a voltage sink at a level less than that of the power supply. The TIA supplies current to the anode of the photo-detector to which its input is coupled. The high frequency modulated and amplified electrical data is output from the TIA on differential signal lines to the AC coupler 224. The output of the AC coupler is subject to amplification in post amplifier 222. The output of the post amplifier is coupled to one or more high frequency data outputs 246–248.

The monitor circuit 260 couples on the low side of the receiver to monitor the received signal strength as measured by the photo-detector 242. The monitor circuit includes the current mirror 276. The current mirror has two legs, a.k.a. a photo-detector leg and a mirror leg, through which pass the photo-detector current "Ip" and a mirror current "Im" respectively. Both legs of the current mirror couple on the negative side to a voltage sink at node 278 which in the example shown is an analog ground. The control leg of the current mirror couples via line 280 with the cathode of the photo-detector 242. The mirror leg 282 of the current mirror supplies the mirror current Im on line 282. The level of the mirror current corresponds with the received optical signal level as detected by the photo-detector. In the embodiment shown, Im is monitored by conversion to a voltage proportional to current at monitor node 284. This is accomplished by resistor 274 which couples the monitor node to an electrical source, e.g. Vcc=5 Volts. The monitor node 284 is coupled to the input of the operational amplifier 268. The op-amp provides an amplified output proportional to the mirror current to an analog-to-digital (A/D) converter 266. The micro-controller 262 accepts the digital signal output of the A/D where it may be utilized as part of a diagnostic. The output of the micro-controller is supplied via monitor control line 290 to the monitor interface 116 (See FIG. 1) for use by network administrator for system level diagnostic and/or maintenance.

The wide operational current range of the photo-detector places a significant demand on the current mirror in terms of linearity and range of performance, e.g. currents ranging over 4–6 orders of magnitude. The current mirrors shown in the following FIGS. 3A–B and 4A–B meet these requirements.

Figure 3A:
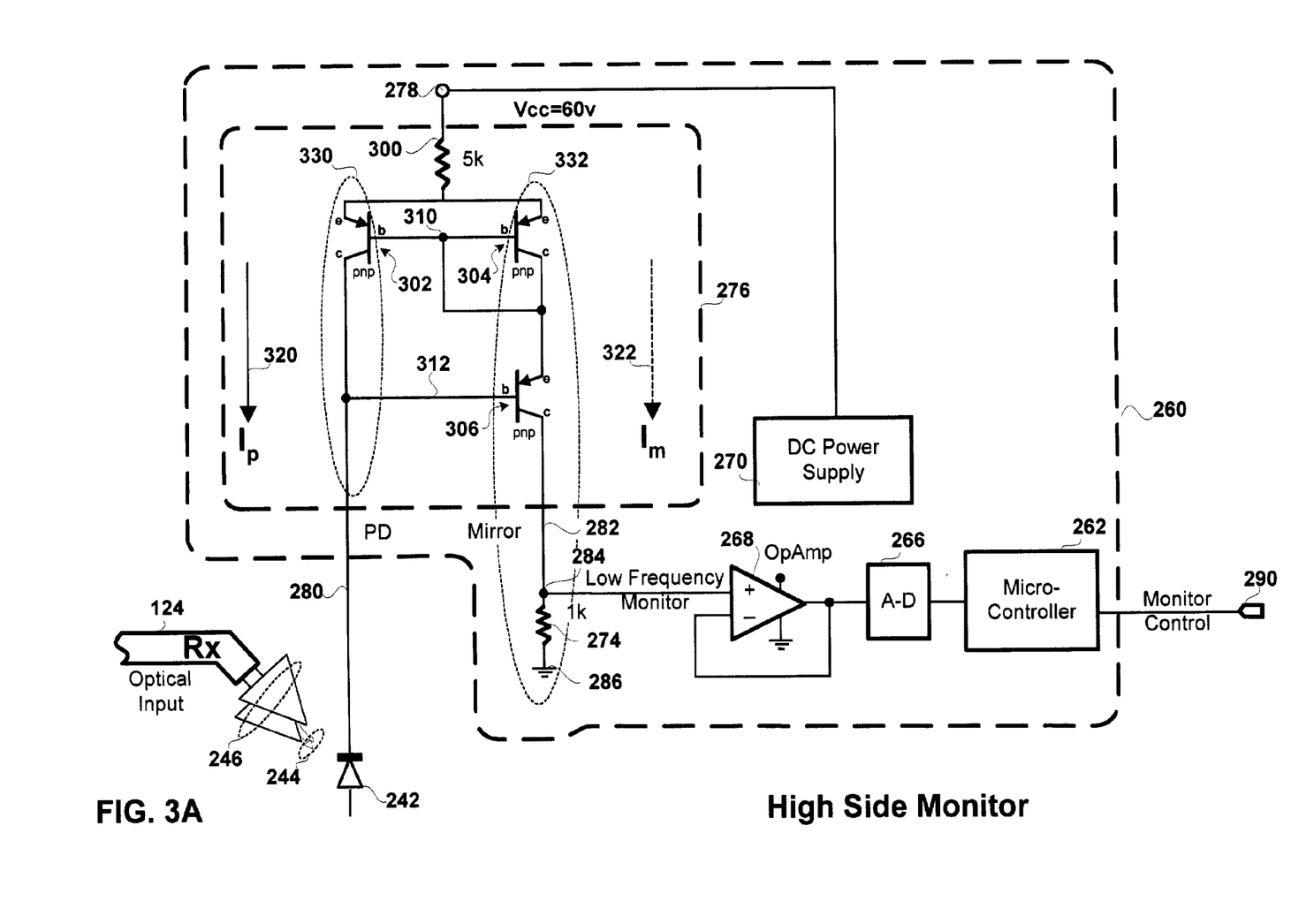
FIGS. 3A–B are detailed circuit diagrams of alternate embodiments of the monitor circuit shown in FIG. 2A.
Figure 3B:
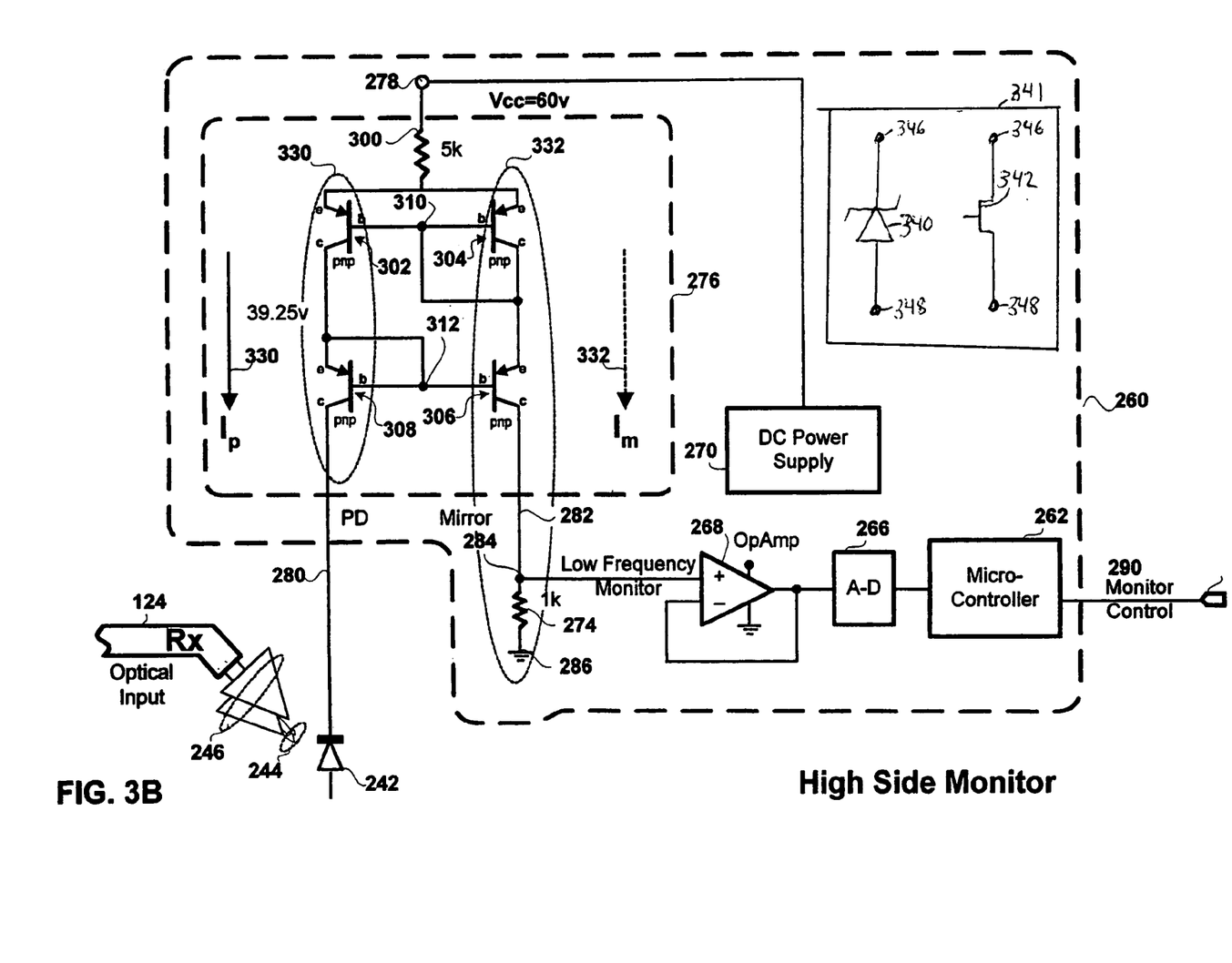

FIGS. 3A–B are detailed circuit diagrams of alternate embodiments of the monitor circuit shown in FIG. 2A and specifically the current mirror 276 portion thereof. The current mirror includes a pair of back-to-back bipolar type transistors 302 and 304 configured as a current mirror. The sense transistor 302 defines the photo-detector (Pd) leg 330 of the current mirror in which flows the photo-detector current Ip reference 320. The mirror transistor 304 defines the monitor leg 332 in which flows the mirror current Im reference 322. The bases of the sense and mirror transistors are coupled to one another and to the collector of the mirror transistor. In the high side embodiment shown in FIGS. 3A–B the sense and mirror transistors comprise 'pnp' type bipolar transistors.

The performance of the current mirror formed by the pair of transistors 302–304 alone is unacceptable, because the mirror current Im generated by the combination of these transistors is limited for practical purposes to an upper range of 5 orders of magnitude. Even within that range the mirror formed by the sense and mirror transistors alone is highly non-linear. Ip and Im differ both in absolute magnitude across the range, e.g. more than 75% difference; as well as in the linearity of the relative magnitudes across the range, e.g. 10% variation.

The Ebers-Moll model of the bipolar transistor provides insight to and quantification of the source of non-linearity and is set forth in the following Equation 1:

Equation 1:

$$I_c = I_o \left( e^{\frac{cV_{be}}{kT}} - 1 \right)$$

where Ic is the collector current, Vbe is the base to emitter voltage drop, Io is the reverse leakage current from the emitter to the base, c is the elementary unit of charge, k is the Boltzmann constant, and T is the absolute temperature (in Kelvin). With typical doping levels, the leakage current arising from the "intrinsic" behavior of the pure semiconductor is very small, and the second term –Io is negligible, giving a simple exponential dependence of Ic on Vbe.

An extension to Ebers-Moll that must be considered in current mirrors is that of the Early effect. The Early effect describes the proportionate change in base-to-emitter voltage for bipolar transistors which occurs with changes in collector-to-emitter voltage. The non-linearity between the mirror current and the photo-detector current results from the differences in the collector-to-emitter voltage drops in the two transistors and the concomitant difference in the base-to-emitter voltages of the two transistors due to the Early effect.

Collector-to-emitter voltage differences can be 40 volts in an APD and 4 volts in a PIN implementation. The sense transistor is typically exposed to a voltage drop of 0.7 volts while the mirror transistor is subject to a voltage drop substantially equal to the full supply voltage. The collector currents in the sense and mirror transistors is very sensitive to differences in the base-to-emitter voltages between the two transistors. The disparity in base-to-emitter voltage drops between the sense and mirror transistors results in substantial and non-linear difference between the mirror current and the photo-detector current.

To reduce the difference in the collector-to-emitter voltage drops between each of the pair of transistors 302, 304 a non-linear isolation element is introduced into the mirror leg, with one terminal coupled to the collector of the mirror transistor 304 and an other terminal coupled to the monitor node 284. Suitable non-linear isolation elements include: a Schmidt or Zener diode, a field effect transistor, and a bipolar transistor. Each of these non-linear isolation elements exhibit a non-linear voltage drop between the at least two terminals in response to varying levels of the mirror current. The voltage drop between the at least two terminals is substantially independent of mirror current. This characteristic improves compliance between the mirror current and the photo-detector current by reducing the collector-to-emitter and hence the base-to-emitter voltage differences between the sense and mirror transistors. The disparity in performance due to the Early effect is therefore substantially reduced.

Figure 5:
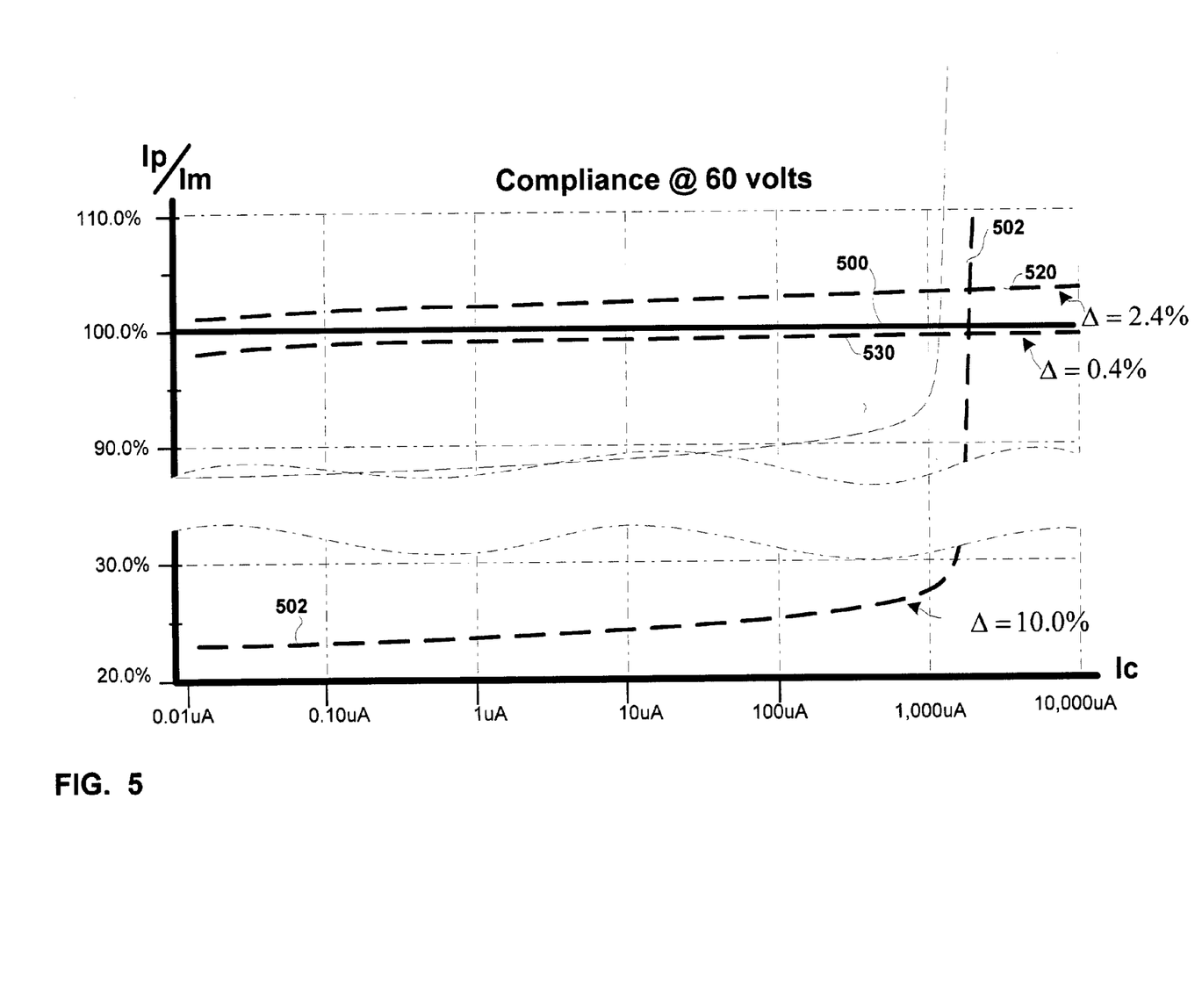
FIG. 5 is a graph showing the photo-detector current (Ip) in the optical receiver and the monitor current (Im) in the monitor circuit for various embodiments of the invention.

Compliance is defined as the quotient of Ip/Im. In the embodiment shown in FIG. 3A the non-linear isolation element is a bipolar transistor 306 with the emitter terminal coupled to the collector of the mirror transistor and the collector coupled to the monitor node 284. The base is coupled via signal line 312 to the collector of the sense transistor 302. The compliance of this current mirror in an APD implementation is shown in FIG. 5 line 520.

FIG. 3B shows an alternate embodiment of the high side current mirror 276 in which another non-linear isolation element is added photo-detector leg between the sense transistor 302 and the photo-detector 242. Suitable non-linear isolation elements include: a Schmidt or Zener diode and a bipolar transistor. In the embodiment shown in FIG. 3B the non-linear isolation element is a bipolar transistor 308 with the emitter terminal coupled to the collector of the sense transistor and the collector coupled to the photo-detector 242. The base is coupled to the collector of the sense transistor 302. The compliance of this current mirror in an APD implementation is shown in FIG. 5 line 530.

In the embodiments shown in FIGS. 3A–B the emitters of the sense and mirror transistors couple to the voltage source 278 via a resistor 300. This resistor is appropriate for embodiments of the invention in which the photo-detector comprises an APD type. Resistor 300 serves the function of varying the supply voltage inversely with respect to the strength of the received optical signal. Thus the supply voltage to the current mirror is reduced as the optical signal strength increases, thereby improving the performance of the APD. Such resistor would not be necessary in an embodiment of the invention in which a PIN type photo-detector was utilized.

FIG. 3B further illustrates alternative embodiments of suitable non-linear isolation elements that can be used in the monitoring circuit 260. The elements illustrated in FIG. 3B in the block 341, like the bipolar transistor 306, are examples of alternative non-linear isolation elements that may be used to improve compliance between the mirror current and the photo-detector current. Non-linear element 340 is a Schmidt or Zener diode, and element 342 is a field effect transistor. Each of the non-linear elements illustrated in block 341 may be connected between a terminal 346, which may be a collector of the transistor 304, and a terminal 348, which may be the monitor node 284.

Figure 4A:
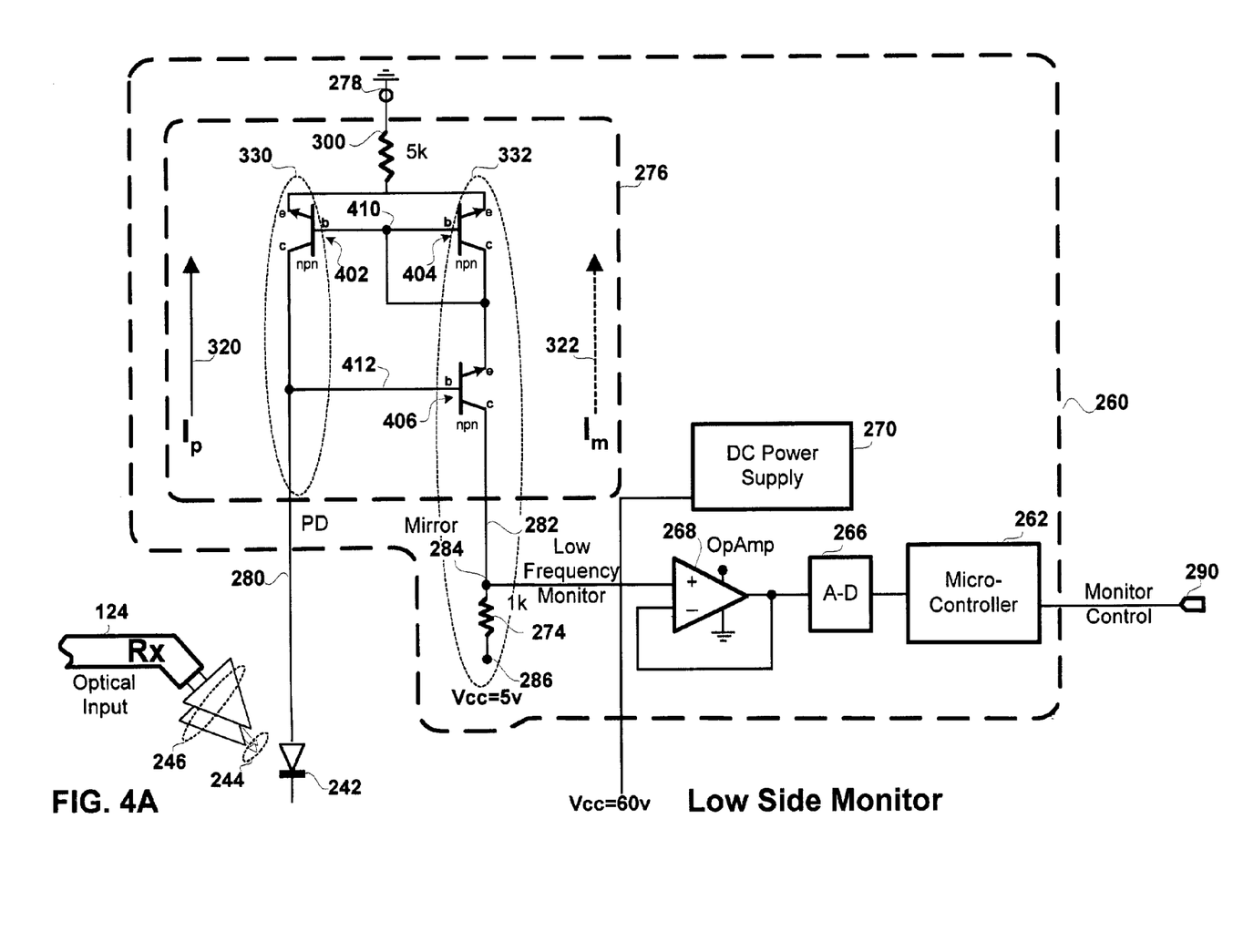
FIGS. 4A–B are detailed circuit diagrams of alternate embodiments of the monitor circuit shown in FIG. 2B.
Figure 4B:
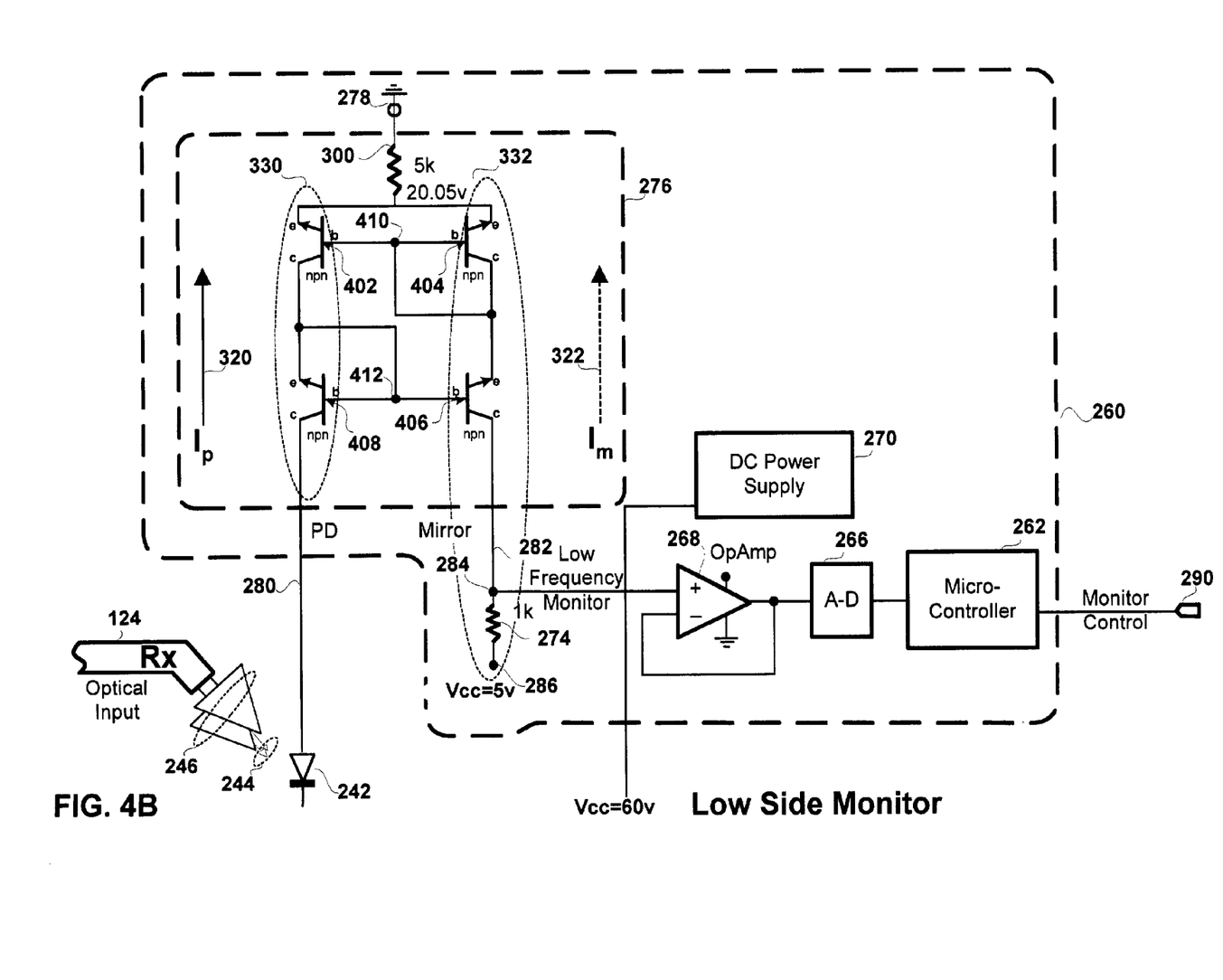

FIGS. 4A–B are detailed circuit diagrams of alternate embodiments of the monitor circuit shown in FIG. 2B with the monitor circuit 260 coupled on the low side of the receiver to monitor the received signal strength as measured by the photo-detector 242. The monitor circuit includes the current mirror 276. The current mirrors shown in FIGS. 4A–B are similar to those shown in FIGS. 3A–B respectively with the exception that the transistors are 'npn' bipolar types with the emitters of the sense and mirror transistors coupled to a voltage sink and with the monitor node 284 coupled through resistor 274 to a voltage source.

FIG. 5 is a graph showing the compliance between the photo-detector current (Ip) and the monitor current (Im) for various embodiments of the invention. The x axis is current over a range from 0.01 uA to 10,000 uA. They axis is compliance expressed as the ratio Ip/Im of the photo-detector current and the mirror current for the embodiments of the monitoring circuit shown in FIGS. 3A–B. In these embodiments the photo-detector is an APD type with a 60 volt power supply. Similar results would be obtained for a PIN type photo-detector. Ideal behavior is represented by line 500 in which compliance between Ip and Im is 100% across the entire current range spanning 6 orders of magnitude.

Curve 502 corresponds to the performance of a current mirror formed by the sense and mirror transistors 302–304 and without non-linear isolation elements, e.g. transistors 306 and 308. Ip is a fraction of Im thus there is no compliance in absolute terms. Additionally, there is substantial non-linearity, e.g. 10% or more over only 5 orders of magnitude and no functionality over a broader range.

Curve 520 corresponds to the compliance of the current mirror shown in FIG. 3A with a single non-linear isolation element on the mirror leg. The circuit exhibits acceptable matching of absolute current magnitudes as well as substantial linearity e.g. 2.4% total deviation in compliance between Ip and Im across the current range of 6 orders of magnitude.

Curve 530 corresponds to the compliance of the current mirror shown in FIG. 3B with two non-linear isolation element, one on mirror leg and the other on the photo-detector leg. The circuit exhibits acceptable matching of absolute current magnitudes as well as substantial linearity e.g. 0.4% total deviation in compliance between Ip and Im across the current range of 6 orders of magnitude.

The exceptional compliance of the current mirrors shown in FIGS. 3A–B and 4A–B allows improved monitoring of the photo-detector portion of the optical receiver for optical network setup, diagnostics, and preventive maintenance.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

What is claimed is:

1. An apparatus for monitoring a photo-detector in an optical receiver, the apparatus comprising:
    a sense transistor of a bipolar type and a mirror transistor of a bipolar type connected in a mirror configuration, the sense transistor sensing a photo-detector current and the mirror transistor mirroring the photo-detector current with a mirror current;
    a first non-linear isolation element with a first terminal and a second terminal, the first terminal coupled to a collector of the mirror transistor and the second terminal connected to a monitor node, the first non-linear isolation element exhibiting a non-linear voltage drop between the first terminal and the second terminal in response to varying levels of the mirror current to improve compliance between the mirror current and the detector current;
    an operational amplifier connected with the monitor node that generates a monitor voltage in response to the mirror current, the operational amplifier receiving the monitor voltage to generate an amplified output proportional to the mirror current that is converted to a digital signal output by an analog to digital converter; and
    a microcontroller that uses the digital signal output to perform diagnostics for an optical receiver.

2. The apparatus of claim 1, wherein the first non-linear isolation element effects a reduction of a voltage differential between a collector of the sense transistor and the collector of the mirror transistor to improve compliance between the mirror current and the photo-detector current.

3. The apparatus of claim 1, further comprising:
    a second non-linear isolation element with a first terminal coupled to a collector of the sense transistor, the second non-linear isolation element exhibiting a non-linear voltage drop between the first terminal and a second terminal in response to varying levels of the detector current, to further improve compliance between the mirror current and the photo-detector current.

4. The apparatus of claim 1, further comprising:
a resistive element coupled in parallel to an emitter of the sense transistor and an emitter of the mirror transistor to vary the voltage at the emitters and correspondingly at the photo-detector in inverse relationship to an optical signal applied to the photo-detector.

5. The apparatus of claim 1, wherein the first non-linear isolation element comprises at least one of: a bipolar transistor, a field effect transistor, and a diode.

6. The apparatus of claim 1, wherein the photo-detector comprises at least one of an avalanche photo-detector (APD) and a positive-intrinsic-negative (PIN) photodetector.

7. The apparatus of claim 1, further comprising:
a monitor coupled to the monitor node to monitor the mirror current level.

8. The apparatus of claim 1, further comprising:
a voltage source and a voltage sink with a selected one of the voltage source and the voltage sink coupled to the emitters of the sense transistor and the mirror transistor and a remaining one of the voltage source and sink coupled to the photo-detector.

9. The apparatus of claim 1, with the photo-detector comprising a receiver portion of an optical transceiver/transponder.

10. A method for monitoring a photo-detector of an optical receiver, the method comprising:
coupling a sense transistor of a bipolar type with a mirror transistor of a bipolar type in a mirror configuration, the sense transistor sensing a photo-detector current in the photo-detector and the mirror transistor mirroring the photo-detector current with a mirror current;
generating a non-linear voltage drop between a collector of the mirror transistor and a monitor node at varying levels of the mirror current to improve compliance between the mirror current and the photo-detector current;
amplifying a voltage generated at the monitor node in response to the mirror current to produce an amplified voltage that is proportional to the mirror current;
converting the amplified voltage to a digital signal output; and
receiving the digital signal output at a microcontroller that utilizes the digital signal as part of a diagnostic for the optical receiver.

11. The method of claim 10, wherein the generating act further comprises:
effecting a reduction of a voltage differential between a collector of the sense transistor and the collector of the mirror transistor to improve compliance between the mirror current and the photo-detector current.

12. The method of claim 10, further comprising:
generating a non-linear voltage drop between a collector of the sense transistor and the photo-detector at varying levels of the photo-detector current to further improve compliance between the mirror current and the photo-detector current.

13. The method of claim 10 further comprising:
varying a voltage at an emitter of the sense transistor and an emitter of the mirror transistor and correspondingly at the photo-detector in inverse relationship to an optical signal applied to the photo-detector.

14. The method of claim 10, wherein the photo-detector comprises at least one of an avalanche photo-detector (APD) and a positive-intrinsic-negative (PIN) photodetector.

15. The method of claim 10, further comprising:
monitoring the mirror current level at the monitor node.

16. The method of claim 10, further comprising:
coupling a selected one of a voltage source and a voltage sink to the emitters of the sense transistor and the mirror transistor; and
coupling a remaining one of the voltage source and voltage sink to the photodetector.

17. An apparatus for monitoring a photo-detector of an optical receiver, the apparatus comprising:
means for coupling a pair of transistors of a bipolar type in a mirror configuration, the pair of transistors including a sense transistor sensing a photo-detector current in the photo-detector and a mirror transistor mirroring the photo-detector current with a mirror current;
means for generating a non-linear voltage drop between a collector of the mirror transistor and a monitor node at varying levels of the mirror current to improve compliance between the mirror current and the detector current;
means for generating a digital signal output from a voltage produced by the mirror current at the monitor node, the digital signal output being proportional to the mirror current; and
means for utilizing the digital signal output as part of a diagnostic.

18. The apparatus of claim 17, wherein the means for generating a non-linear voltage drop further comprises:
means for effecting a reduction of a voltage differential between a collector of the sense transistor and the collector of the mirror transistor to improve compliance between the mirror current and the detector current.

19. The apparatus of claim 17, further comprising:
means for generating a non-linear voltage drop between a collector of the sense transistor and the photo-detector at varying levels of the photo-detector current to further improve compliance between the mirror current and the detector current.

20. The apparatus of claim 17 further comprising:
means for varying a voltage at emitters of the pair of transistors and correspondingly at the photo-detector in inverse relationship to an optical signal applied to the photo-detector.

21. The apparatus of claim 17, wherein the photo-detector comprises at least one of an avalanche photo-detector (APD) and a positive-intrinsic-negative (PIN) photo-detector.

22. The apparatus of claim 17, further comprising:
means for monitoring the mirror current level at the monitor node.

23. The apparatus of claim 17, further comprising:
means for coupling a selected one of a voltage source and a voltage sink to the emitters of the pair of transistors; and
means for coupling a remaining one of the voltage source and voltage sink to the photo-detector.

* * * * *